United States Patent
Watanabe et al.

(10) Patent No.: US 10,349,726 B2
(45) Date of Patent: Jul. 16, 2019

(54) MIRROR FOR AIRCRAFT CREW MEMBERS

(71) Applicant: Komy Co., Ltd., Saitama (JP)

(72) Inventors: Tsuyoshi Watanabe, Kawaguchi (JP); Hisanaga Takeda, Kawaguchi (JP)

(73) Assignee: KOMY CO., LTD, Saitama (JP)

( * ) Notice: Subject to any disclaimer, the term of this patent is extended or adjusted under 35 U.S.C. 154(b) by 0 days.

(21) Appl. No.: 15/301,746

(22) PCT Filed: Jun. 30, 2014

(86) PCT No.: PCT/JP2014/067449
§ 371 (c)(1),
(2) Date: Oct. 4, 2016

(87) PCT Pub. No.: WO2016/001993
PCT Pub. Date: Jan. 7, 2016

(65) Prior Publication Data
US 2017/0027307 A1     Feb. 2, 2017

(51) Int. Cl.
*A45D 42/04* (2006.01)
*A45D 42/22* (2006.01)
(Continued)

(52) U.S. Cl.
CPC .............. *A45D 42/04* (2013.01); *A45D 42/22* (2013.01); *A45D 42/24* (2013.01); *A47G 1/02* (2013.01);
(Continued)

(58) Field of Classification Search
CPC ........ A45D 42/04; A45D 42/12; A45D 42/22; A45D 42/24; G02B 7/002; G02B 7/198;
(Continued)

(56) References Cited

U.S. PATENT DOCUMENTS 2,497,632 A * 2/1950 Schacht ................. A01K 11/00
40/300
2004/0089724 A1   5/2004 Lasch et al.
(Continued)

FOREIGN PATENT DOCUMENTS

CN       201822185    *  5/2011
GB       410026 A       5/1934
(Continued)

OTHER PUBLICATIONS

Proquest translation of CN201822185 obtained Sep. 20, 2017.*
(Continued)

*Primary Examiner* — Kristina M DeHerrera
(74) *Attorney, Agent, or Firm* — Foley & Lardner LLP

(57) ABSTRACT

Provided is a mirror for aircraft crew members, whereby a large effective surface area of the mirror surface can be maintained during use even though the mirror is compact and does not feel bulky when placed inside a pocket. A mirror main body (2) of the mirror (1) for aircraft crew members is formed in a vertically long shape, said mirror (1) being held together with at least a key (9), by a coupling tool (8). A through-hole (7) is provided in an end section in the longitudinal direction of this mirror main body (2), at an eccentric position on one side away from the center (CW) in the width direction. The coupling tool (8) is inserted into this through-hole (7). The through-hole (7) can be a long hole (7A) that extends from the center (CW) in the width direction towards both sides.

11 Claims, 4 Drawing Sheets

(51) Int. Cl.
*A47G 1/02* (2006.01)
*A47G 1/16* (2006.01)
*G02B 7/182* (2006.01)
*A45D 42/24* (2006.01)
*A47G 29/10* (2006.01)

(52) U.S. Cl.
CPC .......... *A47G 1/1653* (2013.01); *G02B 7/182* (2013.01); *A47G 29/10* (2013.01)

(58) Field of Classification Search
CPC ........ G02B 7/182; A47G 1/02; A47G 1/1653; A47G 29/10
USPC ................... 359/838–884; 52/785.11, 785.1; D28/64.1; 70/456 R
See application file for complete search history.

(56) References Cited

U.S. PATENT DOCUMENTS

2010/0208376 A1* 8/2010 Ackerman ............. A45D 42/04
359/881

2014/0146409 A1* 5/2014 Isakai ................. G02B 5/0808
359/884

FOREIGN PATENT DOCUMENTS

| | | | | |
|---|---|---|---|---|
| JP | 59-145833 U | 9/1984 | | |
| JP | 64-57370 U | 4/1989 | | |
| JP | 11-290125 A | 10/1999 | | |
| JP | 3118944 U | 1/2006 | | |
| JP | 3150675 U | 4/2009 | | |
| JP | WO2015/037397 | * | 8/2014 | ............. B32B 27/30 |
| JP | 2015054461 A1 | * | 3/2015 | ............. B32B 27/30 |

OTHER PUBLICATIONS

JPO machine translation of JP2015054461.*
WIPO machine translation of WO2015/037397.*
Anonymous, "Miroir porte-clé paramoteur miniplane," Jan. 21, 2014, XP055432111, Retrieved from the Internet: URL:https://web:archive.org/web/20140121023129/http://www.miniplaneshop.com/fr/accessoires-miniplane/1313-miroir-porte-cle-paramoteur-miniplane.html, retrieved on Dec. 5, 2017, 2 pages.

* cited by examiner

MIRROR FOR AIRCRAFT CREW MEMBERS

CROSS-REFERENCE TO RELATED APPLICATIONS

This application is a National Stage application of PCT/JP2014/067449, filed Jun. 30 2014.

TECHNICAL FIELD

The present invention relates to a mirror for aircraft crew members that is to be held together with at least a key by a coupling tool, and more specifically it relates to a mirror for aircraft crew members that can ensure a large effective mirror surface area during use, while being of a compact size that does not feel bulky when placed inside a pocket.

BACKGROUND ART

Various small occupational tools are required for crew members such as cabin attendants as occupants of aircraft. Absolutely essential among these are keys and small mirrors. Keys are used for locking and unlocking airport facilities that are restricted from entrance by non-personnel, while small mirrors are used to confirm oxygen gas cylinder pressure meters mounted on passenger aircraft or to confirm one's own eye or mouth regions. Miniature lights are also used for sending communication signals outside of the aircraft, but at least the keys and mirrors are held together as essential items by a coupling tool such as a key ring, and are carried after being placed in a uniform pocket.

When such small tools create a bulge in the pocket after having been placed in the pocket, they can potentially create a feeling of discomfort for passengers, and they must therefore be of as compact a size as possible so as not to feel bulky. However, while with keys there is no reduction in function even if the size is reduced, if the size of a mirror is reduced, the function of the mirror may be reduced by the smaller effective mirror surface area, even though it eliminates bulge when they are placed in a pocket.

Mirrors having special specifications have not existed in the prior art as such mirrors for aircraft crew members. Currently, therefore, crew members themselves have been selecting and acquiring appropriate commercial products for use.

For example, a conventional portable mirror is described in Patent Literature 1, although it is not a mirror for aircraft crew members. A through-hole is provided at the end in the longitudinal direction of the mirror main body, and a chain strap or the like is inserted through the through-hole, from which the mirror is suspended.

However, the following problem results when such a small mirror is deployed as a mirror for aircraft crew members, and for example, when an oxygen gas cylinder pressure meter is confirmed with the ring-shaped coupling tool passing through the through-hole and held together with a key.

The key is gripped in the palm of the hand and the mirror alone is turned outward, holding the portion of the through-hole at the center section in the widthwise direction at the end of the mirror, sandwiching it between the thumb and the index finger. However, since the coupling tool runs through the through-hole, it constitutes an obstacle and results in an unstable grip. In order to stably grip the mirror, therefore, the position sandwiched between the thumb and the index finger is transferred further inward in the longitudinal direction than the through-hole, so that a portion of the mirror surface becomes unavoidably covered. As a result, the mirror surface that can be used for reflection is reduced and a larger size mirror must therefore be used, such that the problem described above is not solved.

CITATION LIST

Patent Literature

Patent Literature 1: Japanese Unexamined Patent Publication No. (Hei) 11-290125

SUMMARY OF THE INVENTION

Problems to be Solved by the Invention

It is an object of the invention to provide a mirror for aircraft crew members that is to be held together with at least a key by a coupling tool, the mirror for aircraft crew members being able to ensure a large effective mirror surface area during use while being of a compact size that does not feel bulky when placed inside a pocket.

Means for Solving the Problems

The mirror for aircraft crew members of the invention, designed to achieve this object, is a mirror for aircraft crew members to be held together with at least a key by a coupling tool, the mirror main body being formed in a vertically long shape that has a mirror surface on at least one side, and a through-hole being provided at an end in the longitudinal direction of the mirror main body, at an eccentric position on one side away from the center in the widthwise direction, through which the coupling tool is inserted.

Also, another mode of the mirror for aircraft crew members according to the invention is a mirror for aircraft crew members to be held together with at least a key by a coupling tool, the mirror main body being formed in a vertically long shape that has a mirror surface on at least one side, and a long hole running from the center in the widthwise direction to both sides, at an end in the longitudinal direction of the mirror main body, being provided as a through-hole through which the coupling tool is inserted.

Effect of the Invention

According to the first mirror for aircraft crew members according to the invention, the through-hole through which the coupling tool is inserted is provided in one end in the longitudinal direction of the mirror main body, at an eccentric position on one side away from the center in the widthwise direction, and therefore a wide region in the widthwise direction excluding the portion of the through-hole at the end in the longitudinal direction can be used as the holding section where the coupling tool that can interfere with holding is not present. During use of the mirror, therefore, there is no need to move the holding section to the mirror surface region that is inward in the longitudinal direction, and thus a large effective mirror surface area can be ensured for use while reducing the mirror main body to a compact size.

The inner edge of the through-hole may be at a distance of 10 to 40% of the widthwise direction dimension, from the center in the widthwise direction of the mirror main body. This will make it possible to ensure a wide width for the holding section where the coupling tool is not present, at the end in the longitudinal direction of the mirror main body.

With the mirror for aircraft crew members according to the second mode of the invention, a through-hole through which the coupling tool is inserted is formed as a long hole at the end in the longitudinal direction of the mirror main body, extending from the center in the widthwise direction to each of both sides, and therefore by moving the coupling tool to either of both ends of the long hole and engaging it there during use, it is possible to use a wide region in the widthwise direction, excluding the end section on the side where the coupling tool has been moved, as a holding section where the coupling tool that can interfere with holding is not present. During use of the mirror, therefore, there is no need to move the holding section to the mirror surface region that is inward in the longitudinal direction, and thus a large effective mirror surface area can be ensured for use while reducing the mirror main body to a compact size.

Both outer ends of the long hole may be at a distance of 10 to 40% of the widthwise direction dimension, from the center in the widthwise direction of the mirror main body. This will make it possible to ensure a wide width for the holding section where the coupling tool is not present, at the end in the longitudinal direction of the mirror main body.

Furthermore, at both outer ends of the long hole there may be formed large-diameter holes with larger openings than the hole width of the long hole. With this specification, it is possible to stably hold the coupling tool in each of the large-diameter holes, and it is therefore possible to prevent the coupling tool from inadvertently shifting toward the center side in the widthwise direction and interfering with holding.

According to the invention, the shape of the mirror main body is not particularly restricted so long as it is a vertically long shape, but it is preferably a rectangular shape with chamfered arcs at the four corners, or an elliptical shape. The dimensions of the mirror main body in the longitudinal direction are preferably between 120% and 300% of the dimensions in the widthwise direction. Also, the size of the mirror main body is such that the longitudinal direction dimension is 30 mm to 90 mm and the widthwise direction dimension is 20 mm to 60 mm, while the thickness may be 0.2 mm to 3.0 mm.

The mirror surface may have a scratch hardness that is a pencil hardness of HB to 9H as specified by JIS D0202. Mirror surfaces are prone to damage by scratching due to contact with keys, but this will help prevent such damage and ensure a clear mirror image.

MODE FOR CARRYING OUT THE INVENTION

Embodiments of the invention will now be explained with reference to the accompanying drawings.

Figure 1:
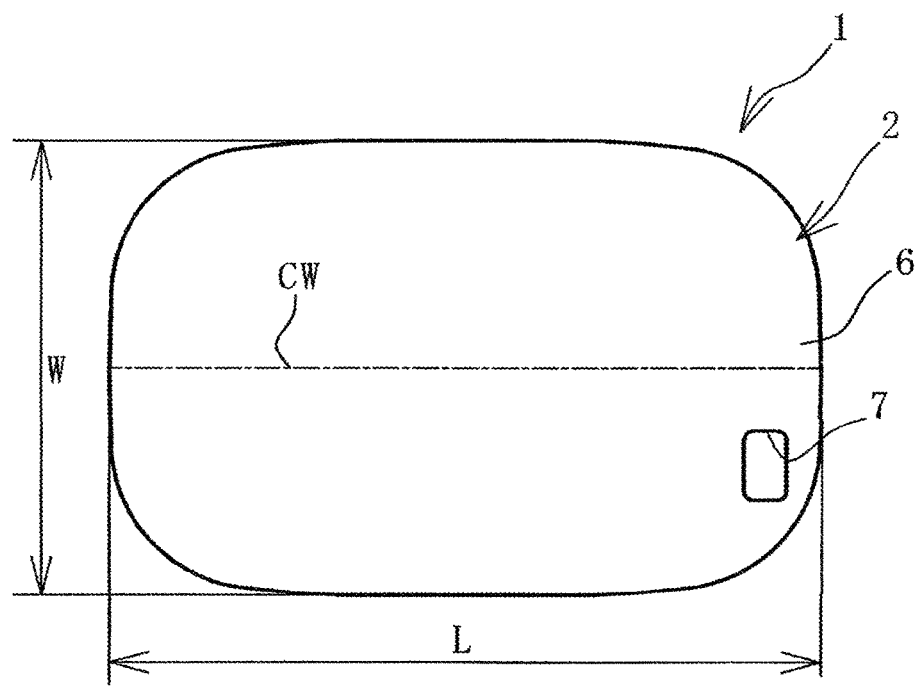
FIG. 1 is an illustration of the mirror for aircraft crew members of the invention as viewed flat.
Figure 2:
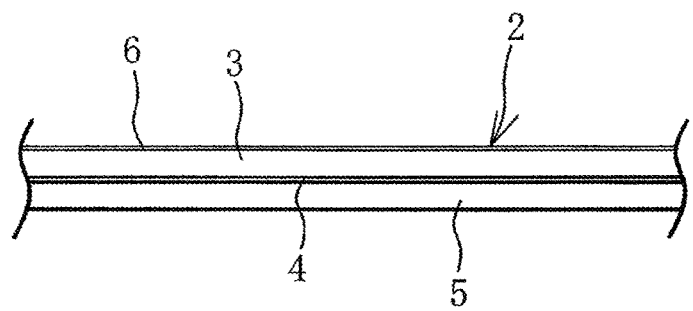
FIG. 2 is an illustration showing a cross-sectional view of a portion of the mirror of FIG. 1.
Figure 3:
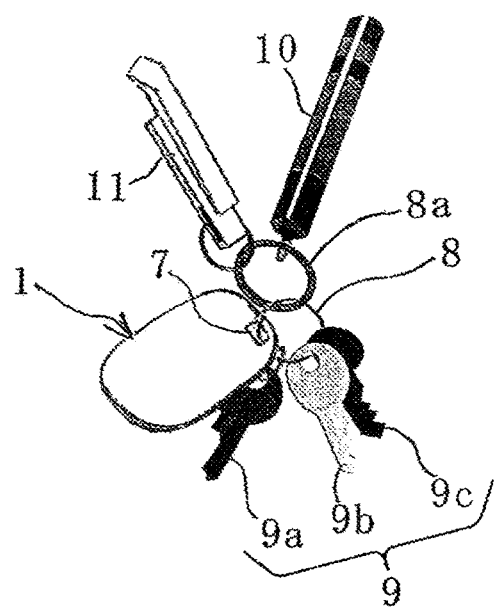
FIG. 3 is an illustration showing a mirror of the invention being held together with a key by a coupling tool.

FIG. 1 and FIG. 2 show a mirror for aircraft crew members 1 (hereunder, "mirror 1") according to the invention. The mirror main body 2 of the mirror 1 is formed by a plate with a vertically long shape, a through-hole 7 being formed at an eccentric position away to one side from the center in the widthwise direction, at the end in the longitudinal direction. As shown in FIG. 3, the mirror 1 is held together with keys 9, with a metallic coupling tool 8 in the shape of a ring such as a key ring being inserted through the through-hole 7. The keys 9 are small tools that are essential for aircraft crew members, and for this embodiment, three keys 9a, 9b, 9c are held. Additional small tools that are held by a ring-shaped coupling tool 8a are a small light 10 and a can opener 11, and connection of the coupling tool 8a to the coupling tool 8 allows the mirror 1 and the keys 9 (9a, 9b, 9c) to be held together.

The mirror main body 2 that has a vertically long shape is formed by forming a reflective layer 4 by metal vapor deposition or metal plating on the inner side of a transparent resin sheet 3, and coating a non-transparent resin protective layer 5, such as a paint, on the back side of the reflective layer 4. The reflective layer 4 forms a flat mirror surface on the front side, through the transparent resin sheet 3. On the outer surface of the transparent resin sheet 3 there may be formed a hard transparent resin as a hard coat layer 6, if necessary. The hard coat layer 6 can help prevent scratching damage caused by contact of the surface of the transparent resin sheet 3 with the metal keys 9. The hard coat layer 6 can be formed by coating the surface of the transparent resin sheet 3 with a film of an uncured ultraviolet curing resin or thermosetting resin, and subjecting it to ultraviolet irradiation or heat treatment for curing, or alternatively by pre-forming it into a transparent film and integrally bonding the film with the surface of the transparent resin sheet 3.

The mirror main body 2 of the invention may also be a metal sheet alone, formed by polishing or metal plating one or both sides of a stainless steel sheet to form a mirror surface.

Examples for transparent resins to be used in the transparent resin sheet 3 include polyethylene, polypropylene, polyethylene terephthalate, ABS, acryl, polycarbonate and polyamide. The resin of the protective layer 5 is non-transparent, but preferably it is formed by coating a paint. If necessary, the same transparent resin as the transparent resin sheet 3 may be used, to form mirror surfaces on both sides of the mirror main body 2.

The metal forming the reflective layer 4 is preferably a metal with high reflectance, such as aluminum or silver. The mirror surface to be formed by the transparent resin sheet 3 and the reflective layer 4 may be a flat, convex, concave or fresnel surface, but it is preferably a flat or convex surface. The form of a convex or concave surface may be either spherical or cylindrical. When the mirror surface is a convex or concave surface, the curvature radius R is preferably 1000 mm or greater, as a gentle curved surface. It is more preferably 1000 mm to 3000 mm.

The shape of the mirror main body 2 of the invention is not particularly restricted so long as it is a vertically long shape. With a vertically long shape, the holding section at the end in the longitudinal direction can be ensured during use, and a large effective mirror surface area can be ensured. The shape of the mirror main body 2, which is a vertically long shape, may be rectangular with the four corners chamfered into arc shapes, or it may be elliptical. The curvature radius of the arcs at the chamfered four corners of the rectangular shape may be in the range of 1.5 mm to 10 mm. In the case of an ellipsoid, a "superellipsoid" as described below is particularly preferred.

According to the invention, a superellipsoid shape is one wherein the exponent n in formula (1) below is greater than 2, and it is closer to a rectangular shape than a normal ellipsoid in which the exponent n is 2.

$$(x/a)^n + (y/b)^n = 1 \tag{1}$$

The superellipsoid shape preferably has an exponent n of 3 to 4. The mirror 1 shown in FIG. 1 is a superellipsoid shape in which the exponent n is 3.5. Since a superellipsoid shape has no straight lines around the periphery but rather smooth curves, it is easily held by the hand, and is not easily apparent when placed in a uniform jacket or pants pocket.

The through-hole 7 of the mirror main body 2 through which the ring-shaped coupling tool 8 passes is provided at the end of the mirror main body 2 in the longitudinal direction, and at an eccentric position on one side away from the widthwise center CW. The distance by which the through-hole 7 is on one side away from the widthwise center CW is such that the inner edge of the through-hole 7 (the edge facing the widthwise center CW side) is at preferably a position distant by 10% to 40%, and more preferably a position distant by 15% to 40%, of the widthwise direction dimension W of the mirror main body 2. Also, the distance (thickness) of the outermost end of the through-hole 7 in the longitudinal direction of the mirror main body 2 is preferably such as to avoid chipping loss by pulling force on the coupling tool 8. The distance (thickness) is preferably about 2 mm to 6 mm, for example, although this will differ depending on the material (strength) of the mirror main body 2.

The through-hole 7 is formed so that the ring portion of the coupling tool 8 can be smoothly inserted through it, and the shape may be quadrilateral, circular, elliptical or the like. The size is preferably 3 mm×3 mm to 6 mm×8 mm for a quadrilateral shape, or preferably 3 mm to 6 mm as the diameter for a circular shape.

Figure 4:
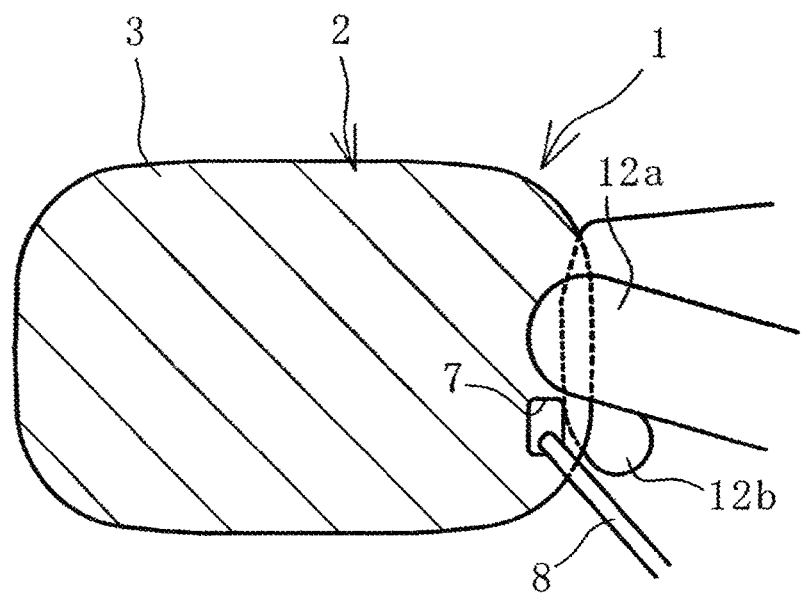
FIG. 4 is an illustration showing the state of a mirror of the invention when it is held by one hand.

When the mirror 1 of the invention is to be used for confirmation of an oxygen gas cylinder pressure meter or for confirmation of the mouth or eyes of one's own face, the keys 9, etc., excluding the mirror 1, are gripped with the palm of the hand and, as shown in FIG. 4, a wide belt-shaped region extending in the widthwise direction on the side opposite from the through-hole 7 is sandwiched between the thumb 12a and the index finger 12b, at the end in the longitudinal direction of the mirror main body 2, to grip the mirror 1. Preferably, as shown in FIG. 4, the center section in the widthwise direction is sandwiched between the thumb 12a and the index finger 12b to grip the mirror 1.

In other words, the coupling tool 8 that can interfere with holding is not present in the belt-shaped region extending on the opposite side in the widthwise direction, excluding the portion of the through-hole 7, so that any desired portion of the belt-shaped region can be held to stably grip the mirror 1. Thus, since it is not necessary to move the gripping position to the mirror surface region on the inner side in the longitudinal direction beyond the coupling tool in the through-hole, as in the prior art, it is possible to ensure an effective mirror surface area even with a compact mirror, without having to increase the size of the mirror 1.

In the mirror 1 of the invention that exhibits this effect, the ratio of the longitudinal direction dimension L of the vertically long shape of the mirror main body 2 with respect to its widthwise direction dimension W is preferably 120% to 300% and more preferably 150% to 200%. Also, the size of the mirror main body 2 in the longitudinal direction and the widthwise direction is preferably 30 mm to 90 mm and more preferably 45 mm to 55 mm as the longitudinal direction dimension L, and preferably 20 mm to 60 mm and more preferably 25 mm to 35 mm as the widthwise direction dimension W. Also, the thickness of the mirror main body 2 is preferably 0.2 mm to 3 mm and more preferably 1 mm to 2 mm. If the mirror main body 2 has such specifications, it will have low bulk when placed in the pocket and carried, it will be easy to place and remove, and will exhibit the aforementioned effects.

Since the mirror surface of the mirror main body 2 is prone to damage by contact with the keys 9, the scratch hardness of the mirror surface may be HB to 9H, as the pencil hardness specified by JIS D0202. It is more preferably 4H to 9H. If the mirror surface has such a pencil hardness, and especially if it is in the range of 4H to 9H, it will be resistant to damage. These ranges for the scratch hardness, in particular, can be achieved by forming a hard coat layer 6 on the surface of the transparent resin sheet 3.

The mirror surface (front side) and the back side of the mirror main body 2 may be given different surface roughnesses to allow distinction by hand contact in the pocket. For example, the surface roughness on the back side may be greater than on the mirror surface (front side) of the mirror main body 2. Alternatively, distinguishing protrusions (with at least different shapes, sizes or number) may be provided on the mirror surface (front side) and back side of the mirror main body 2. By providing such a distinguishing function, the crew member can distinguish between the mirror surface (front side) and the back side of the mirror main body 2 simply by contact by the hand in the pocket.

Figure 5:
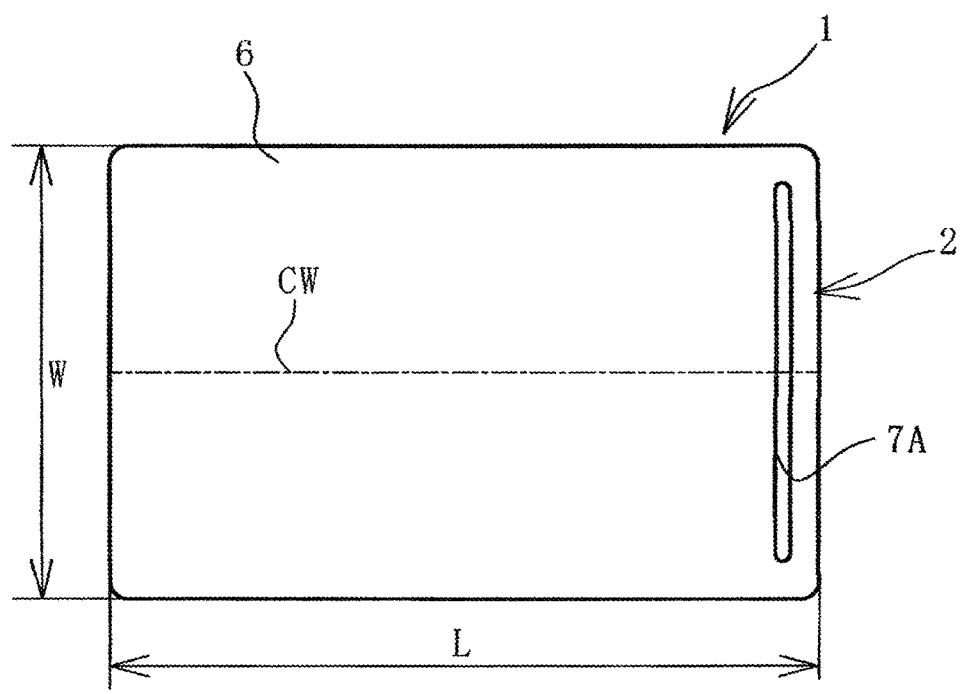
FIG. 5 is an illustration showing another embodiment of the mirror of the invention as viewed flat.
Figure 6:
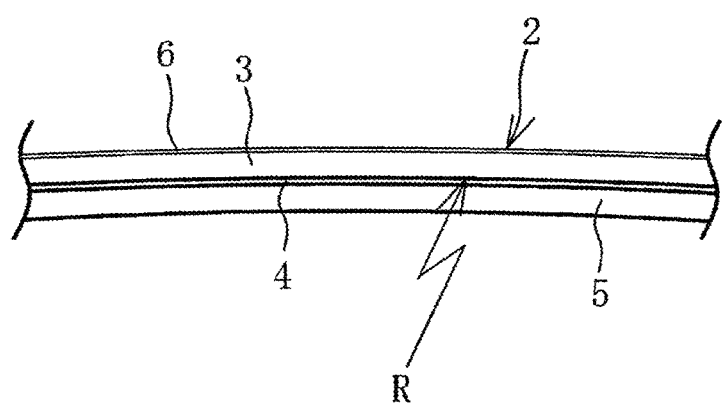
FIG. 6 is an illustration showing a cross-sectional view of a portion of the mirror of FIG. 5.

FIG. 5 and FIG. 6 show different embodiments of the mirror 1 of the invention. The major aspect in which this mirror 1 differs from the mirrors of FIG. 1 and FIG. 2 is that the through-hole 7 provided at the end in the longitudinal direction of the mirror main body 2 is formed as a long hole 7A extending from the widthwise center CW to a large extent on both sides, while the construction of the other major parts may have the same construction. The long hole 7A is the through-hole 7 through which the coupling tool 8 is inserted. The long hole 7A has a hole width allowing the coupling tool 8 to smoothly move in the longitudinal direction of the hole. In the mirror main body 2 of this embodiment, the mirror surface has a gently curved convex shape.

When the mirror 1 is used, the coupling tool 8 is moved to either of both ends of the long hole 7A, and the keys 9, etc., are gripped in the palm of the hand, excluding the mirror 1 that is held in the coupling tool 8. Also, the holding section is the entire region excluding the end to which the coupling tool 8 has been moved in the long hole 7A at the end in the longitudinal direction of the mirror main body 2, and preferably the center section in the widthwise direction of the long hole 7A is sandwiched between the thumb 12a and the index finger 12b to grip the mirror 1. Since the mirror 1 can therefore be gripped without the presence of the coupling tool 8 that can interfere with stable gripping, there is no need to shift the thumb 12a to the mirror surface toward the center side in the longitudinal direction for gripping, as in the prior art. In other words, the mirror 1 of this embodiment also exhibits the same effect as the mirror 1 of the embodiment described above.

In order to ensure this effect, preferably both outer ends of the long hole 7A are formed extending from the widthwise center CW of the mirror main body 2 to positions at a distance of 10% to 40% of the widthwise direction dimension W. This numerical range is more preferably 15% to 40%. Also, the distance (thickness) of the outermost end of the long hole 7A in the longitudinal direction of the mirror main body 2 is preferably such as to avoid chipping and loss by pulling force on the coupling tool 8. The distance (thickness) is preferably about 2 mm to 6 mm, for example, although this will differ depending on the material (strength) of the mirror main body 2.

For this embodiment, the front side is covered by a hard coat layer 6 in order to prevent damage to the front side (mirror surface) of the transparent resin sheet 3. This will result in a scratch hardness of the mirror surface that is a pencil hardness of 4H to 9H as specified by JIS D0202.

Figure 7:
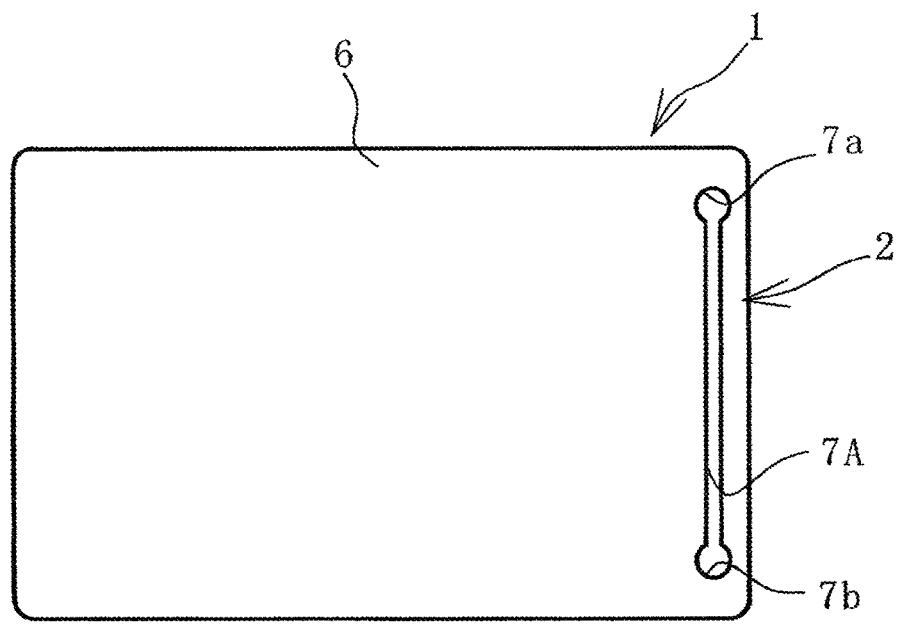
FIG. 7 is an illustration showing yet another embodiment of the mirror of the invention as viewed flat.

FIG. 7 shows yet another embodiment of the mirror 1 of the invention. For this embodiment, the large-diameter holes 7a, 7b are formed having larger openings than the hole width of the long hole 7A, at both outer ends of the long hole 7A of the mirror 1 of the embodiment illustrated in FIG. 5. When the mirror 1 is used, therefore, and the coupling tool 8 is moved in one of the longitudinal directions of the long hole 7A and engaged with the large-diameter hole 7a, 7b at one end, it is possible to stably hold the coupling tool 8. This also helps prevent the coupling tool 8 from moving to the center in the widthwise direction along the long hole 7A and interfering with gripping of the mirror.

Furthermore, since the coupling tool 8 can be held at either of the large-diameter holes 7a, 7b of this mirror 1, it is possible to prevent frictional loss of the long hole 7A caused by sliding of the coupling tool 8 along the long hole 7A with time. This mirror 1 is therefore advantageous for extending the life (useful life) of the mirror 1.

A printed side 6a may also be provided on a portion of the mirror main body 2 of the mirror 1 of the invention. For example, the printed side 6a may be provided on the front side of the mirror main body 2 on which the mirror surface is formed, at an end in the longitudinal direction. Alternatively, the printed side 6a may be provided on the back side of the mirror main body 2 on which the mirror surface is not formed, either over its entirety or over a desired portion thereof.

Figure 8:
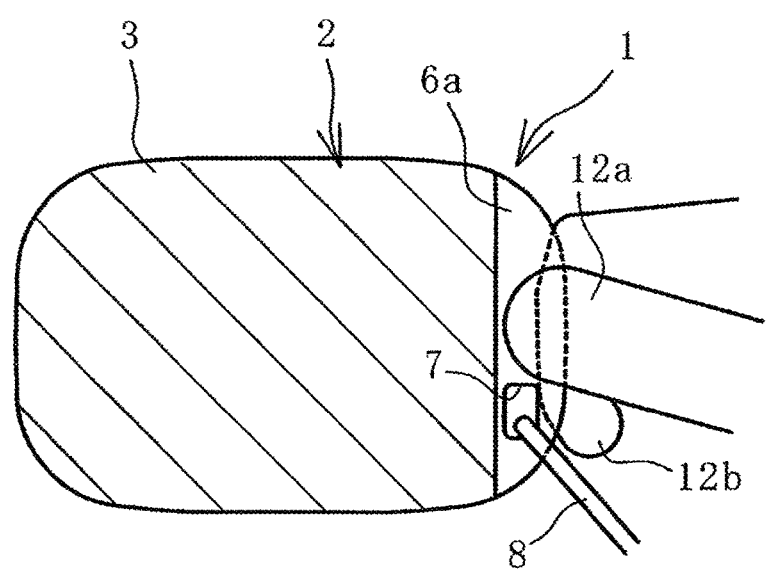
FIG. 8 is an illustration showing the state of another embodiment of the mirror of the invention when it is held by one hand.

In the embodiment of the mirror 1 shown in FIG. 8, the printed side 6a is provided along the widthwise direction, on the end of the mirror main body 2 in the longitudinal direction which is the side on which the through-hole 8 is formed. In other words, on the front side (mirror surface) of the mirror main body 2 there is provided a printed side 6a at the end region in the longitudinal direction on the side where the mirror 1 is held. The printed side 6a is printed with ink of a non-transparent color, and is not limited to a single color but may employ multiple colors. Characters, designs and the like may also be included.

If the mirror surface of the mirror 1 on which the printed side 6a is not provided is held by the thumb 12a, etc. fingerprints may remain on the held position, resulting in visible fouling of the mirror surface. However, if the mirror 1 is provided with the printed side 6a, fingerprints remaining on the mirror surface are less visible due to the presence of the printed side 6a, and it is therefore possible to avoid filthiness due to fouling. Furthermore, since the region of the printed side 6a is generally the region that is held, the advantage of easier handling of the mirror 1 is obtained.

The printed side 6a is provided on the front side of the hard coat layer 6, for example. If the region of the printed side 6a becomes too wide toward the center section side in the longitudinal direction of the mirror main body 2, the effective mirror surface area will be reduced. Therefore, as regards the region of the printed side 6a in the longitudinal direction of the mirror main body 2, it may be approximately the region in which the through-hole 7 is formed from the edge of the mirror main body 2 in the longitudinal direction, as shown in FIG. 8.

The printed side 6a may also be provided on the back side of the mirror main body 2. The entire surface on the back side of the mirror main body 2 may also be used as a printed side 6a. On the printed side 6a there may be recorded various types of information such as the ID number of the owner of the mirror 1, or the owning company mark (or advertisement or publicity information). Recording an ID identifying the owner on the printed side 6a is convenient to determine the owner if the mirror 1 is lost. Also, since the mirror 1 is to be used to confirm oxygen gas cylinder pressure meters, a verification marker for the proper range of the oxygen gas cylinder pressure, or similar, may also be included on the printed side 6a.

EXPLANATION OF SYMBOLS

1 Mirror
2 Mirror main body
3 Transparent resin sheet
4 Reflective layer
5 Protective layer
6 Hard coat layer
6a Printed side
7 Through-hole
7A Long hole (through-hole)
7a, 7b Large-diameter holes
8, 8a Coupling tool
9 (9a, 9b, 9c) Keys
10 Small light
11 Can opener
12a Thumb
12b Index finger

The invention claimed is:

1. A mirror for aircraft crew members to be held together with at least a key by a coupling tool, the mirror main body being formed in a vertically long shape that has a mirror surface on at least one side, a through-hole being provided at an end in the longitudinal direction of the mirror main body, at an eccentric position on one side away from the center in the widthwise direction, through which the coupling tool is inserted, the mirror surface having a printed layer of a non-transparent color ink disposed only at the end of the longitudinal direction of the mirror surface as well as extending along the widthwise direction of the mirror surface on which the through-hole is formed, the printed layer configured to reduce visibility of fingerprints on the corresponding locations of the mirror surface, and the mirror surface extends to ends of three sides of the mirror main body other than the one side of the mirror main body, the mirror main body further comprising: a transparent resin sheet; a reflective layer provided on a first surface of the transparent resin sheet; a non-transparent protective layer positioned on the reflective layer; and a hard coat layer positioned on the mirror surface of the transparent resin sheet opposite the first surface, the hard coat layer causing the mirror surface to have a scratch hardness in a range of 4 H to 9 H measured using a pencil hardness test method as specified by JISD0202 standard, wherein the mirror main body has a superellipsoid shape represented by the formula:

$$(x/a)^n + (y/b)^n = 1$$

where n is 3 to 4.

2. The mirror for aircraft crew members according to claim 1, wherein the inner edge of the through-hole is at a position at a distance of 10 to 40% of the entire width of the mirror main body, from the center in the widthwise direction of the mirror main body.

3. The mirror for aircraft crew members according to claim 1, wherein the longitudinal direction dimension of the mirror main body is between 120% and 300% of the widthwise direction dimension.

4. The mirror for aircraft crew members according to claim 3, wherein the dimension in the longitudinal direction of the mirror main body is 30 mm to 90 mm, the widthwise direction dimension is 20 mm to 60 mm, and the thickness is 0.2 mm to 3.0 mm.

5. A mirror for aircraft crew members to be held together with at least a key by a coupling tool, the mirror main body being formed in a vertically long shape that has a mirror surface on at least one side, and a slit shaped hole running across the mirror in a widthwise direction thereof, at an end in the longitudinal direction of the mirror main body, being provided as a through-hole through which the coupling tool is inserted, the coupling tool movable within the slit shaped hole, the mirror surface having a printed layer of a non-transparent color ink layered only at the end of the longitudinal direction of the mirror surface as well as extending along the widthwise direction of the mirror surface on which the slit shaped hole is provided, the printed layer configured to reduce visibility of fingerprints on the corresponding locations of the mirror surface, wherein the mirror main body has a superellipsoid shape represented by the formula:

$$(x/a)^n + (y/b)^n = 1$$

where n is 3 to 4.

6. The mirror for aircraft crew members according to claim 5, wherein both outer ends of the long hole are at positions at a distance of 10 to 40% of the entire width of the mirror main body, from the center in the widthwise direction of the mirror main body.

7. The mirror for aircraft crew members according to claim 6, wherein large-diameter holes with larger openings than the hole width of the long hole are formed at both outer ends of the long hole.

8. The mirror for aircraft crew members according to claim 5, wherein large-diameter holes with larger openings than the hole width of the long hole are formed at both outer ends of the long hole.

9. The mirror for aircraft crew members according to claim 5, wherein the longitudinal direction dimension of the mirror main body is between 120% and 300% of the widthwise direction dimension.

10. The mirror for aircraft crew members according to claim 9, wherein the dimension in the longitudinal direction of the mirror main body is 30 mm to 90 mm, the widthwise direction dimension is 20 mm to 60 mm, and the thickness is 0.2 mm to 3.0 mm.

11. The mirror for aircraft crew members according to claim 5, wherein the mirror main body further comprises:

a transparent resin sheet;

a reflective layer provided on a first surface of the transparent resin sheet;

a non-transparent protective layer positioned on the reflective layer; and a hard coat layer positioned on a mirror surface of the transparent resin sheet opposite the first surface, such that the scratch hardness of the mirror surface is 4 H to 9 H measured using a pencil hardness test method as specified by JIS D0202 standard.

* * * * *